United States Patent
Mano

(10) Patent No.: US 6,664,996 B2
(45) Date of Patent: Dec. 16, 2003

(54) LASER BEAM SCANNER AND PHOTOGRAPHIC PRINTER INCLUDING A DRIVER FOR DRIVING A MODULATOR USING OPTICAL MODULATION DATA

(75) Inventor: Kozo Mano, Wakayama (JP)

(73) Assignee: Noritsu Koki Co., Ltd., Wakayama (JP)

(*) Notice: Subject to any disclaimer, the term of this patent is extended or adjusted under 35 U.S.C. 154(b) by 65 days.

(21) Appl. No.: 09/817,034

(22) Filed: Mar. 27, 2001

(65) Prior Publication Data

US 2001/0028389 A1 Oct. 11, 2001

(30) Foreign Application Priority Data

Mar. 28, 2000  (JP) .......................................... 2000-88732

(51) Int. Cl.$^7$ ............................................... B41J 2/435
(52) U.S. Cl. ...................................... 347/236; 347/246
(58) Field of Search ................................. 347/236, 237, 347/239, 246, 247, 251, 253, 255, 248; 359/310

(56) References Cited

U.S. PATENT DOCUMENTS

| | | | |
|---|---|---|---|
| 4,367,926 A | * 1/1983 | Hohki | ......................... 359/310 |
| 5,369,423 A | * 11/1994 | Hunter et al. | ................ 347/255 |
| 6,052,141 A | * 4/2000 | Takeuchi | ..................... 347/246 |
| 6,084,627 A | * 7/2000 | Cook et al. | .................. 347/248 |
| 6,169,563 B1 | * 1/2001 | Doi | ............................. 347/236 |

* cited by examiner

Primary Examiner—Hai Pham
(74) Attorney, Agent, or Firm—Smith Patent Office

(57) ABSTRACT

In a laser beam scanner of used for exposing a latent image on a photographic paper, intensities of the laser beams are maintained in predetermined range by compensating amplitude of driving signals supplied to acousto-optic modulators when intensities of the laser beams emitted from laser light sources are varied. The intensities of the laser beams passing through the modulators are sensed by photo sensors and compared with predetermined standard value. When any of the intensity of the laser beam is discrepant from the standard value, a difference between them is calculated and an optical modulation data for controlling the amplitude of the driving signal is compensated by subtracting the difference value from the standard value. Thereby, the amplitude of the driving signal of the modulator is compensated.

14 Claims, 6 Drawing Sheets

LASER BEAM SCANNER AND PHOTOGRAPHIC PRINTER INCLUDING A DRIVER FOR DRIVING A MODULATOR USING OPTICAL MODULATION DATA

BACKGROUND OF THE INVENTION

1. Field of the Invention

This invention relates to a laser beam scanner and a photographic printer using the laser beam scanner as an exposure apparatus for exposing a photographic paper.

2. Description of the Related Art

A conventional a photographic printer using a laser beam scanner as an exposure apparatus, for example, shown in Publication Gazette of Japanese Patent application Hei 11-84293 is described. In the photographic printer, a photographic paper is conveyed in a predetermined direction (hereupon, the direction is called "sub-scanning direction") at a predetermined constant speed. Laser beams corresponding to three primary colors or complementary colors thereof are scanned on a photo-sensitive surface of the photographic paper in a main scanning direction perpendicular to the sub-scanning direction. Intensities of the laser beams are respectively modulated for corresponding to an image data which is taken by scanning a film or photograph by an image pickup scanner or directly taken by a digital camera, or the like.

In the equipment using the laser beam scanner as an exposure unit, photo sensors such as photo diodes are generally provided in optical paths of the laser beams for sensing intensities of the laser beams. The sensed results of the photo sensors are fed back to drivers of the laser light sources, so that driving signals of the laser light sources are compensated for maintaining the intensities of the laser beams in a predetermined range.

In the photographic printer, it is required to reduce the variation of the intensity of the laser beams less than ±1% for realizing proper quality of the printed photograph. On the other hand, since the laser light sources are easily affected by environmental conditions, or the like, it is difficult to reduce the variation of the intensities of the laser beams less than ±3% even when the sensed results of the actual intensity of the laser beams are fed back. Thus, the variation of the intensity of the laser beam causes a variation of the density in a monochrome, and causes a variation of tint in a color photograph. Furthermore, when the same photographs are reprinted by using the same film in future, there is a possibility that the tint of the reprinted photographs will be different from the original print.

SUMMARY OF THE INVENTION

An object of the present invention is to provide a laser beam scanner and a photographic printer using the same, by which the variation of the intensities of the laser beams is reduced less than±1% so that the quality of the printed photograph can be maintained or improved.

A laser beam scanner in accordance with the present invention comprises at least one set of a laser light source for emitting a laser light beam, a modulator for modulating an intensity of a laser beam passing therethrough, and a driver for driving the modulator by using optical modulation data. A photo sensor is disposed on an optical path of the laser beam passing through the modulator for sensing an intensity of the laser beam passing through the modulator. The driver includes a renewable lookup table for memorizing a set of optical modulation data corresponding to respective stages of gradation of image data, and a compensator for compensating the optical modulation data in the lookup table by using the intensity of the laser beam sensed by the photo sensor when the intensity of the laser beam is discrepant from a predetermined initial value.

By such a configuration, even when the intensity of the laser beam passing through the modulator is discrepant from the standard value due to the variation of the intensity of the laser beam emitted from the laser light source, the optical modulation data used for controlling the modulator are compensated so that the actual intensity of the laser beam passing through the modulator coincides with or approaches to the standard value. Thus, the variation of the intensity of the laser beam passing through the modulator is maintained in a predetermined range less than that of the laser beam emitted from the laser light source.

A photographic printer in accordance with the present invention includes the above-mentioned laser beam scanner, a conveyor for conveying a photographic paper to the predetermined scanning plane of the above-mentioned laser beam scanner and a developer for developing a latent image exposed on the photographic paper by the laser beam scanner.

By using the above-mentioned laser beam scanner as an exposure unit, the variation of the intensity of the laser beam used for exposing a latent image on a photographic paper can be restricted in a very narrow range, so that the quality of the printed photograph can be increased.

DETAILED DESCRIPTION OF THE EMBODIMENT

An embodiment of a laser beam scanner and a photographic printer using the same in accordance with this invention is described.

Figure 1:
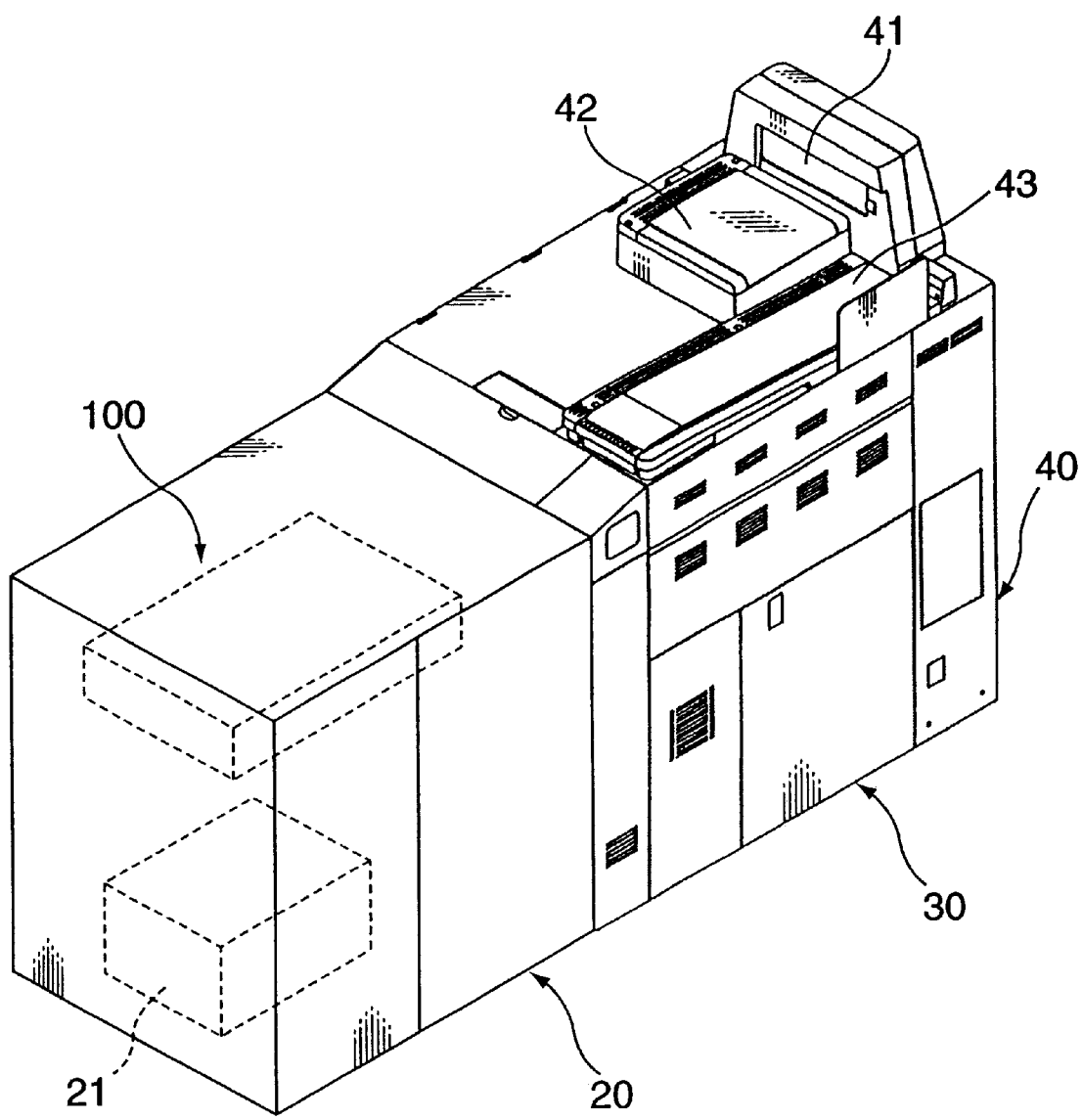
FIG. 1 is a perspective view for showing an appearance of a photographic printer in accordance with the present invention.

An appearance of the photographic printer in the embodiment is shown in FIG. 1. The photographic printer comprises an exposure unit 20 for exposing a photographic paper, a developing unit 30 for developing, fixing, bleaching and stabilizing the photographic paper and a drying unit 40 for drying the photographic paper. A first belt conveyor 42 and a second belt conveyor 43 are provided on the top of the developing unit 30. Developed photographic paper sheets carried out from an outlet 41 are piled on the first belt conveyor 42 by the same job corresponding to, for example, the images included in the same film or memory card. Each bunch of the photographic paper sheets are aligned on the second belt conveyor 43.

The exposure unit 20 is a dark box including a laser beam scanner 100, a magazine 21 containing a roll of photographic paper, a cutter for cutting the photographic paper into a predetermined size of a photographic paper sheet, a conveyor for pulling out the photographic paper from the magazine 21 to the cutter and for conveying the photographic paper sheet to the developing unit 30 through an exposing portion.

Figure 2:
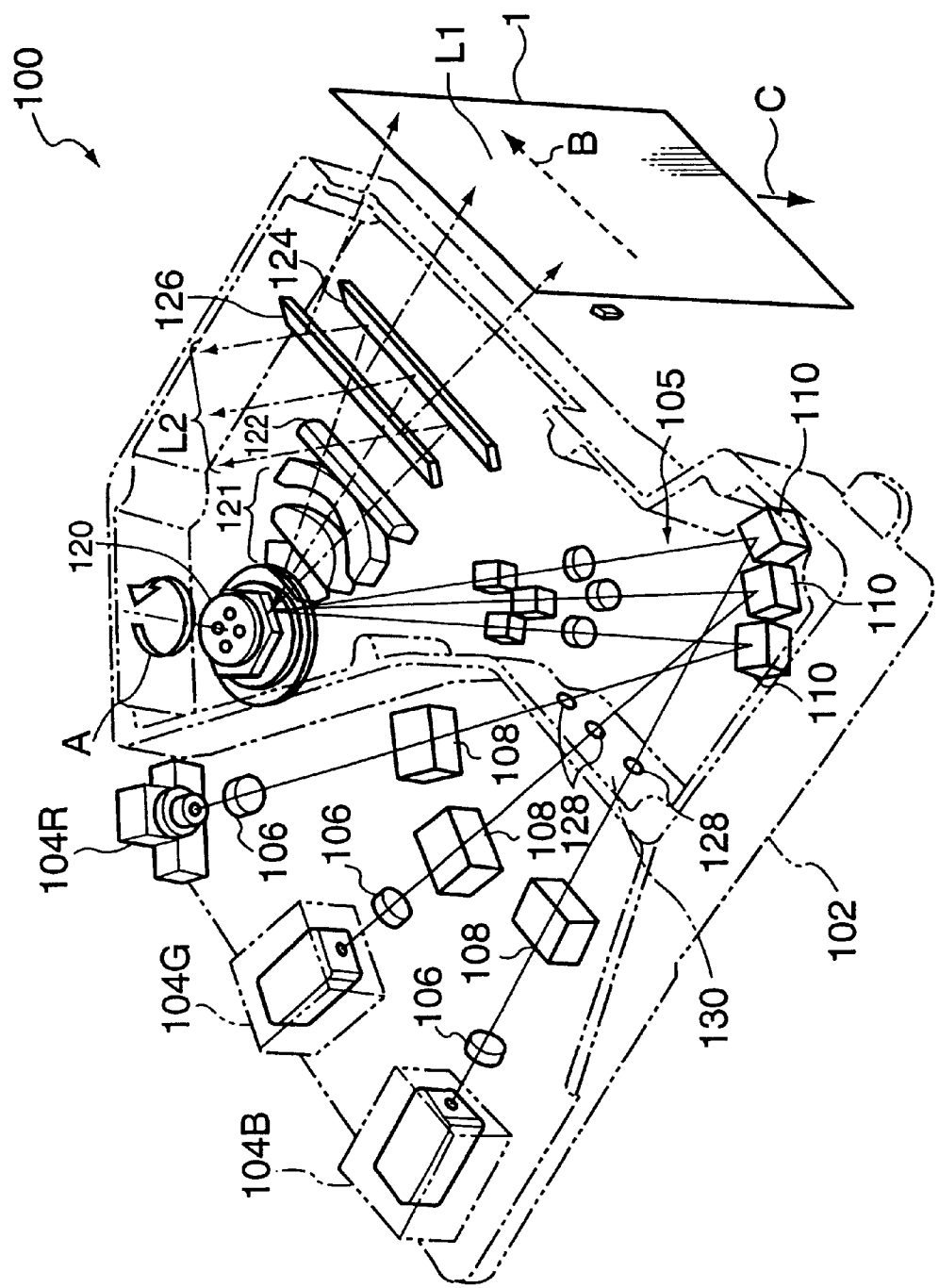
FIG. 2 is a perspective view for showing a configuration of a laser beam scanner in an embodiment in accordance with the present invention.

Detailed configuration of the laser beam scanner 100 used for exposing the photographic paper sheet is shown in FIG. 2. The laser beam scanner 100 comprises three laser light sources 104R, 10G and 104B respectively corresponding to three principal colors of red, green and blue. The laser light source 104R includes a semiconductor laser for emitting a red laser beam having a wavelength of 680 nm. The laser light source 104G includes the semiconductor laser and a wavelength converting device for converting the laser beam emitted from the semiconductor laser to a green laser beam having a wavelength of 532 nm. The laser light source 104B includes the semiconductor laser and a wavelength converting device for converting the laser beam emitted from the semiconductor laser to a blue laser beam having a wavelength of 473 nm.

Three sets of a collimator lens 106 and an acousto-optic modulator 108 are respectively provided in front of the laser beam emitting surface of the laser light sources 104R, 104G and 104B. Three adjustable mirrors 110 are provided on optical paths 105 of the laser beams emitted from the laser light sources 104R, 104G and 104 B for reflecting the laser beams toward a polygon mirror 120. The polygon mirror 120 is rotated, for example, in a direction shown by arrow A at a predetermined constant rotation speed for reflecting the laser beams in a predetermined direction.

An fθ lens 121, a cylindrical lens 122, a pair of mirrors 124 and 126 are serially disposed in front of the polygon mirror 120. The laser beams are deflected by the rotation of the polygon mirror 120, the fθ lens 121 and the cylindrical lens 122 in the main scanning direction shown by arrow B, and reflected by the mirrors 124 and 126 in the sub-scanning direction shown by arrow C. The mirror 126 is a half mirror serving as a beam splitter for splitting the laser beams into two ways shown by symbols L1 and L2.

As can be seen from FIG. 2, a housing 102 of the laser beam scanner 100 is separated in two sections by a wall 130. Electronic elements of the laser light sources 104R, 10G and 104B and the acousto-optic modulators 108, and so on are concentratively disposed in the left hand section of the wall 130. On the other hand, optical and mechanical elements of the mirrors 110, 124 and 126, the polygon mirror 120 and the fθ lens 121, and so on are concentratively disposed in the right hand section of the wall 130. Three through holes 128 are formed on the wall 130 through which the laser beams emitted from the laser light sources 104R, 104G and 104B enter into the adjustable mirrors 110 in the right hand section.

Figure 3:
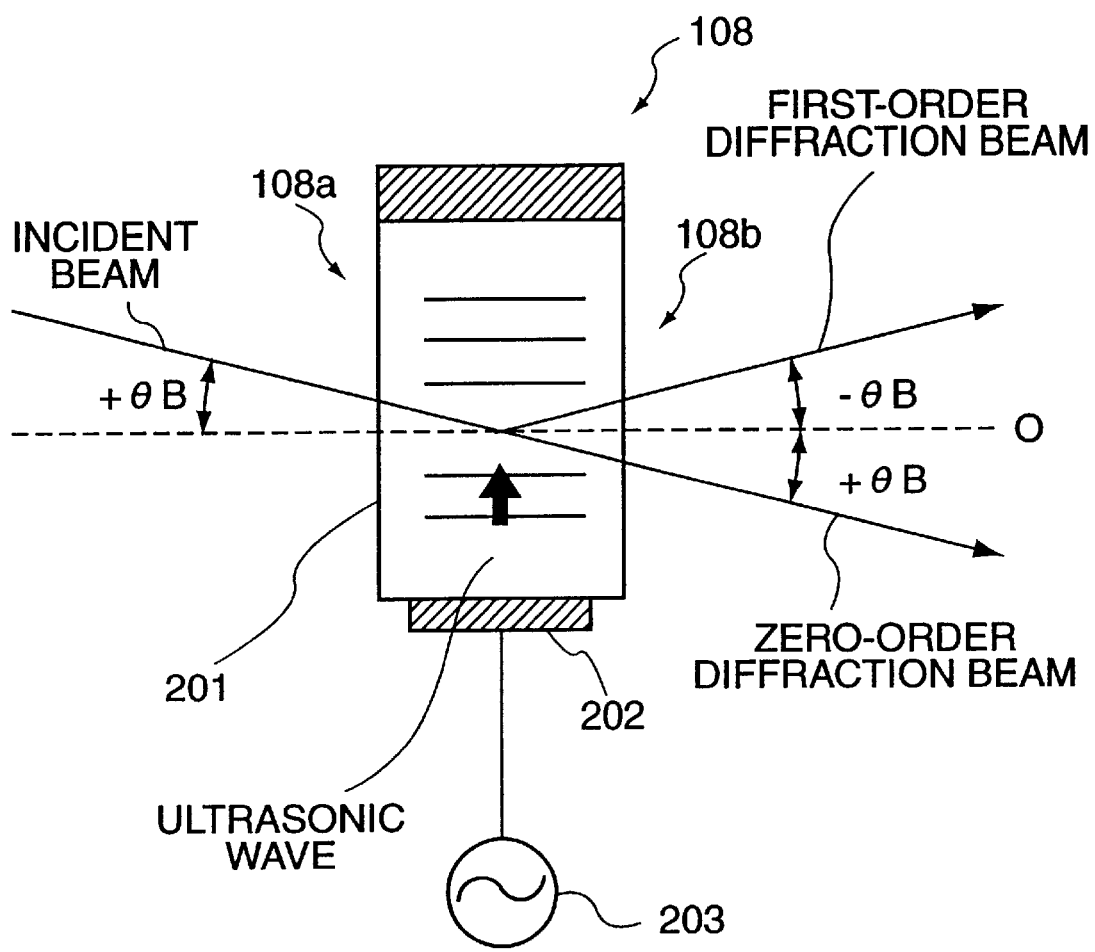
FIG. 3 is a schematic sectional view for showing a configuration and principle of an acousto-optic modulator used in the laser beam scanner in the embodiment.

A configuration and principle of the acousto-optical modulator 108 (hereinafter abbreviated as "modulator") is described with reference to FIG. 3. The modulator 108 is configured by an acousto-optic element 201, an ultrasonic transducer 202, a driver 203, and so on. The acousto-optic element 201 is, for example, made of a glass such as tellurite glass or silica glass, and has a cubic shape. The ultrasonic transducer 202 is fixed on a face perpendicular to an incident face 108a and an exit face 108b of the laser beams in the acousto-optic element 201. Total sizes of the modulator 108 except the driver 203 is about 2 cm (longitude)×2 cm (lateral)×1 cm (height).

When the ultrasonic transducer 202 is driven by driving signals supplied from the driver 203, periodic variation of refractive index serving as a diffraction grating occurs in the acousto-optic element 201. When the laser beam having an incident angle $+\theta_B$ with respect to the normal "O" of the incident plane 108a of the acousto-optical element 201 enters into the modulator 108, the laser beam is diffracted by Bragg reflection of the diffraction grating generated by the ultrasonic vibration. A zero-order diffraction beam (direct beam) exits from the exit face 108b with an exit angle $+\theta_B$, and a first-order diffraction beam exits from the exit face 108b with an exit angle $-\theta_B$. The zero-order diffraction beam is shielded by the wall 130 of the housing 102, so that the zero-order diffraction beam cannot enter into the adjustable mirror 110. On the other hand, the first-order diffraction beam can pass through the through hole 128 on the wall 130, so that the first-order diffraction beam can enter into the adjustable mirror 110.

In the acousto-optic element the diffraction angle $\theta_B$ and the intensity "I" of the diffraction beam are shown by he following equations.

$$\sin\theta_B = \frac{K}{k} \quad I = I_0 \sin^2\left(\frac{A}{\lambda^2}M_e P\right)^{\frac{1}{2}}$$

Hereupon, symbols "K" and "k" respectively designate wave numbers of the ultrasonic wave and the laser beam. Symbol "$I_0$" designates the intensity of the incident laser beam. Symbol "P" designates power of the ultrasonic wave. Symbol "λ" designates a wavelength of the laser beam. Symbol "A" designates a factor decided by a shape of the ultrasonic beam. Symbol "$M_e$" designates an inherent factor of the material of the acousto-optic element.

As can be found from the above-mentioned equations, the intensity of the first-order diffraction beam can be varied by varying the amplitude of the driving signal supplied to the ultrasonic transducer 202. In the photographic printer, the amplitude of the driving signal is momently varied corresponding to the gradation of the image data with respect to each principal color.

A circular opening having a diameter about 3 mm is formed on each of the incident face 108a and the exit face 108b of the modulator 108, through which the incident laser beam can enter into the acousto-optic element 201 and the diffracted beams can exit from the acousto-optic element 201. A diameter of the laser beam is about 3 μm. An optical path of the laser beam is adjusted in a manner so that the laser beam passes through the acousto-optic element 201 in a tolerance of about 0.3 mm with respect to the normal at the center of the incident face 108a.

Figure 4:
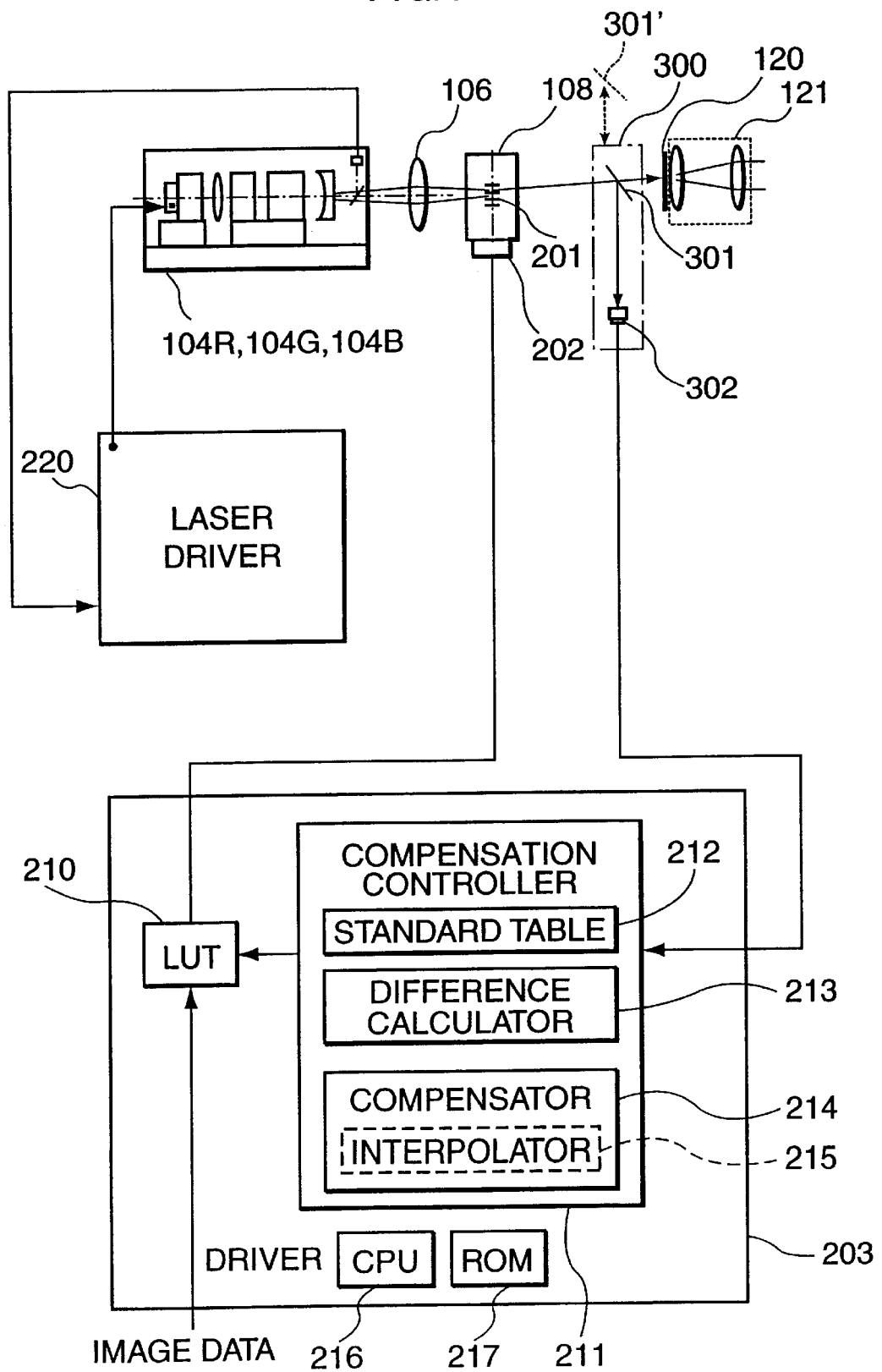
FIG. 4 is a block diagram of a feedback system for controlling an intensity of a laser beam in the embodiment.

A block diagram of driving control system of the modulator 108 is shown in FIG. 4. A beam splitter 301 such as a half mirror is provided in each optical path of the laser beams between the modulator 108 and the polygon mirror 120. A part, for example, about 1% of the laser beam emitted from the laser light source 104R, 104G or 104B is reflected toward a photo sensor 302 such as a photo diode by the beam splitter 301, and the remainder passes through the beam splitter 301 toward the polygon mirror 120. The beam splitter 301 and the photo sensor 302 configures a photosensitive portion 300. The intensity of the laser beams emitted from the laser light source 104R, 104G or 104B is sensed and fed back by a laser driver 220.

The driver 203 comprises a CPU (Central Processing Unit) 216 for executing predetermined programs, a ROM (Read Only Memory) 217 for memorizing the predetermined programs, a compensation controller 211 and a renewable lookup table (first memory) 210. The lookup table (LUT) 210 is a memory such as a RAM (Random Access Memory). Contents of the lookup table 210 is, for example, eight bit data of a set of the optical modulation data corresponding to 256 stages of gradation of the image data. The optical modulation data in the lookup table 210 is used for controlling the amplitude of the driving signal supplied to the ultrasonic transducer 202. The lookup table 210 has 256 (0 to 255) addresses corresponding to the 256 stages of the gradation of the image data. Each optical modulation data is memorized in the address having the same number as that of the stage of the gradation. With respect to color photographic printer, three sets of the optical modulation data corresponding to the three principal colors of red, green and blue are prepared in the lookup table 210 in each driver 203 corresponding to the laser beams of the three principal colors.

The compensation controller 211 includes a standard table (second memory) 212 for memorizing a set of standard values of the intensities of the laser beams, a difference calculator 213 for calculating difference values between actual intensities of the laser beam sensed at a predetermined interval by the photo sensor 302 and predetermined standard values, and a compensator 214 for compensating the values of the optical modulation data in the lookup table 210 by using the difference values. When the actual intensity of the laser beam is larger than the standard value, the difference value becomes positive. Alternatively, when the actual intensity of the laser beam is smaller than the standard value, the difference value becomes negative. The standard table 212 is a nonvolatile memory such as a ROM.

In the normal exposing process, the CPU 216 searches and picks up an optical modulation data corresponding to the gradation of the image data at each moment among 256 data of the optical modulation data in the lookup table 210 with respect to each principal color. The amplitude of the driving signal is varied for corresponding to the searched optical modulation data. The CPU 216 repeats the above-mentioned search and pickup of the optical modulation data until the exposure of the photographic paper is completed. As a result, a color latent image corresponding to the image data is exposed on the photographic paper.

On the other hand, in the compensation process while the laser beams are not used for exposing the photographic paper, the CPU 216 serially picks up the optical modulation data one by one corresponding to the 256 stages of the gradation among 256 data of the initialized optical modulation data in the lookup table 210 with respect to each principal color. The amplitude of the driving signal is varied for corresponding to the optical modulation data, so that the intensity of the laser beam passing through each modulator 108 varies corresponding to the optical modulation data. The actual intensity of the laser beam passing through the modulator 108 sensed by the photo sensor 302 at each moment is compared with a standard values corresponding to the gradation at the moment. When the intensity of the laser beam emitted from the laser light source 104R, 104G or 104B is varied from the initial value thereof, the actual intensity of the laser beam sensed by the photo sensor 302 will be discrepant from the standard value. Thus, the compensation controller 211 compensates the optical modulation data in the lookup table 210 so as to coincide or approach the actual intensity of the laser beam with or to the standard value. The CPU 216 repeats the above-mentioned process until the intensities of the laser beams corresponding to all 256 stages of the gradation are measured. As a result, the variation of the intensities of the laser beams passing through the modulators 108 with respect to the three principal colors are maintained in a predetermined range less than +1%, even when the intensities of the laser beams emitted from the laser light sources 104R, 104G and 104B are varied in the range less than+3%.

Figure 5:
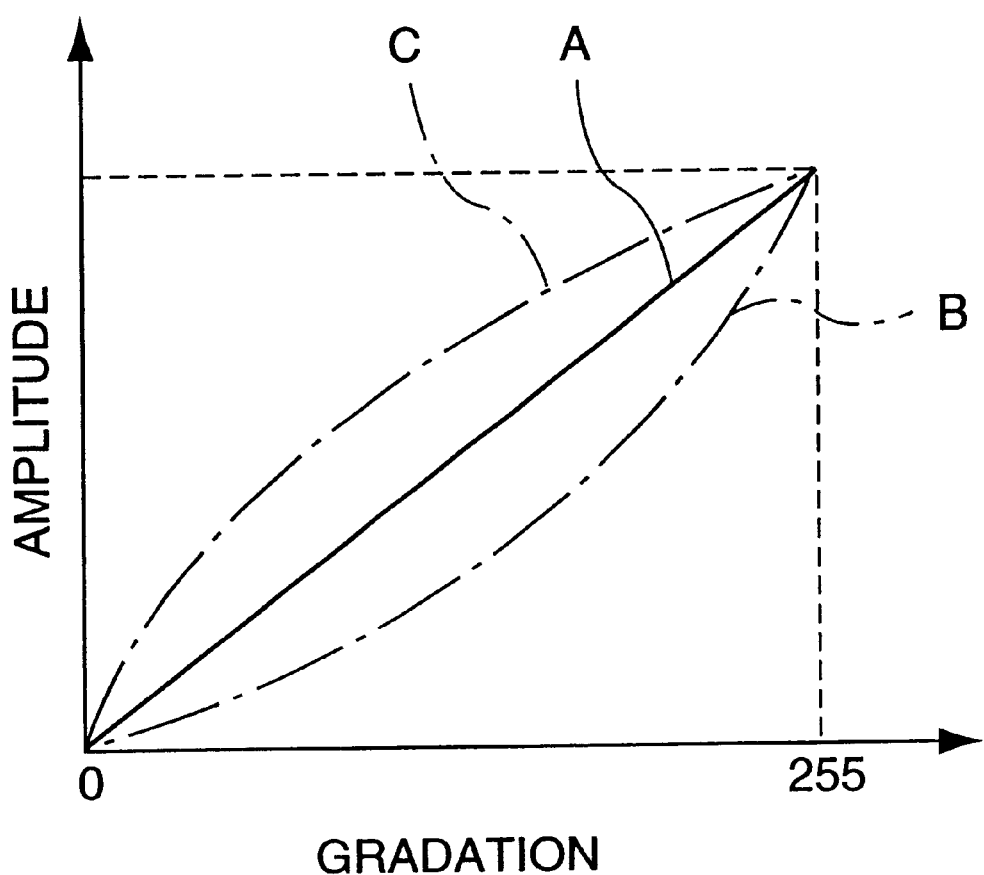
FIG. 5 is a graph for showing examples of characteristic curves of relations between amplitude of driving signal of an acousto-optic modulator and gradation of an image data.

An example of characteristic curves used for compensating the optical modulation data in the lookup table 210 is shown in FIG. 5. In FIG. 5, the ordinate designates the amplitude of the driving signal, and the abscissa designates the gradation of the image data.

An inherent characteristics of the intensity of the laser beam emitted from the laser light source 104R, 104G or 104B corresponding to the standard values memorized in the standard table 212 is assumed to be linear as shown by a characteristic curve "A". In the shipment of the photographic printer, the same data as the standard values are memorized in the lookup table 210 as initial values. Furthermore, it is assumed that an actual characteristics of the intensity of the laser beam sensed by the photo sensor 302 is nonlinear as shown by a characteristic curve "B". For compensating the characteristics of the intensity of the laser beam which will pass through the modulator 108 to be linear, it is necessary to compensate the amplitude of the driving signal so as to have a nonlinear characteristics shown by a characteristic curve "C" which is opposite to the characteristic curve "B".

In the above-mentioned example shown in FIG. 5, the value on the characteristic curve "B" at each stage of the gradation of the image data is smaller than the standard value on the characteristic curve "A", so that the difference value calculated by the difference calculator 213 are negative. The compensator 214 subtracts the difference value from the standard value. In other words, the absolute value of the difference value is added to the standard value. As a result, the characteristics shown by the characteristic curve "C" can be obtained.

In the above-mentioned compensation, the difference value is directly subtracted from the standard vale. It, however, is possible to multiply a predetermined coefficient to the difference value to be subtracted. Alternatively, it is possible to add or subtract a predetermined value from the standard value further to the difference value.

Furthermore, it, however, is not necessary to sense the intensity of the laser beam by the photo sensor 302 and to calculate the difference values by the difference calculator 213 with respect to all the 256 stages of the gradation of the image data. It is possible to execute the sensing of the intensity of the laser beam and the calculation of the difference values with respect to predetermined number, for example, 18 of stages of the gradation at predetermined interval. The difference values with respect to the stages of the gradation to which the intensities of the laser beams are not sensed by the photo sensor 302 are calculated by the interpolation such as proportional distribution by an interpolator 215 included in the compensator 214. In the latter case, it is possible to decrease the number of the sensing of the intensities of the laser beams, so that a time necessary for compensating the optical modulation data in the lookup table 210 can be shortened.

Figure 6:
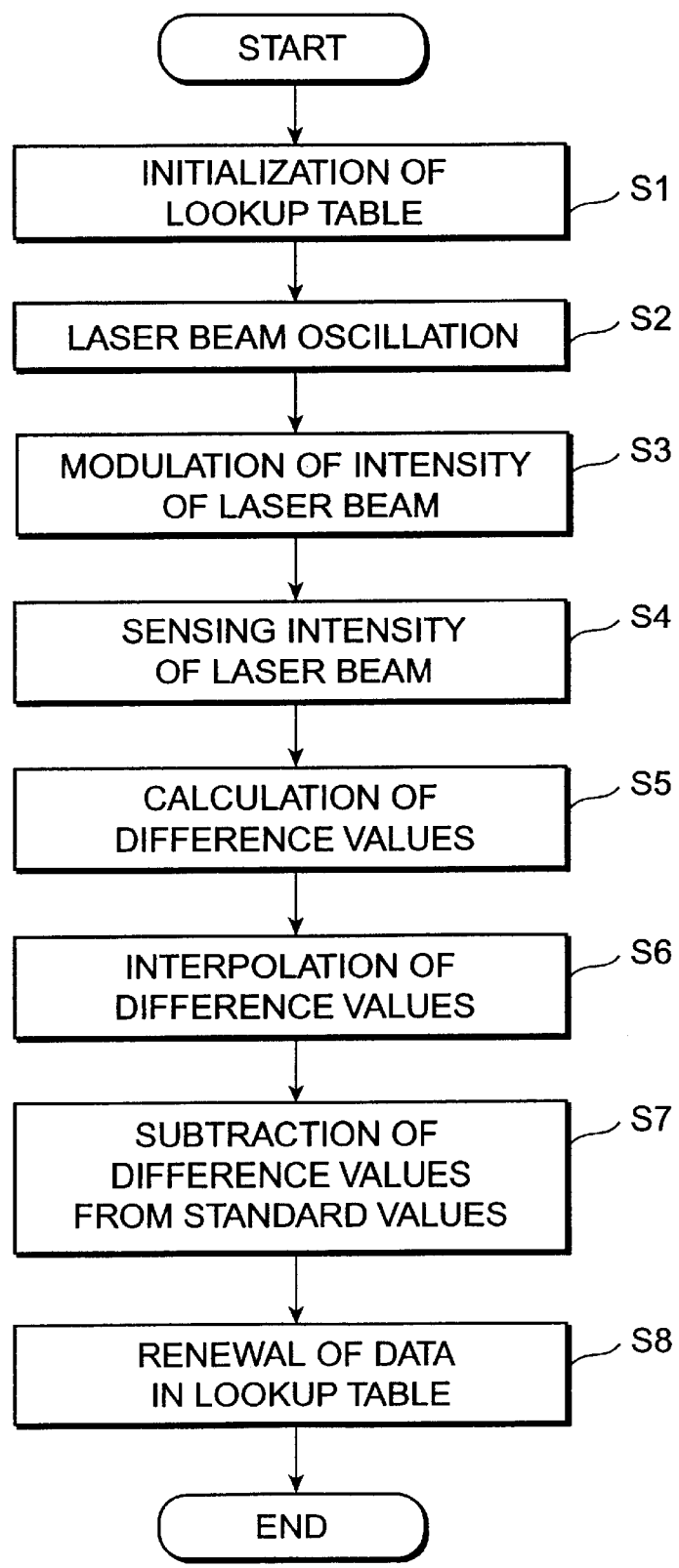
FIG. 6 is a flowchart for showing compensation process of optical modulation data in a lookup table and used for compensating the amplitude of the driving signal in the embodiment.

The compensation process of the optical modulation data in the lookup table 210 is described with reference to the flow chart shown in FIG. 6.

When the compensation process is started, the contents of the lookup table 210 is initialized to be the same as the standard values (Step S1). Subsequently, any one of or all of the laser light sources 104R, 104G and 104B is/are started to be driven for oscillating the laser beam(s) (Step S2). While the laser beam emitted from the laser light source 104R, 104G or 104B passes through the modulator 108, the intensity of the laser beam is modulated by using a predetermined sample data (Step S3).

When the laser beam passing through the modulator 108 reaches to the beam splitter 301, a part of the laser beam is reflected toward the photo sensor 302. The photo sensor 302 senses the intensity of the reflected laser beam at a predetermined interval in synchronism with variation of the sample data (Step S4). The sensed values corresponding to the intensities of the laser beam by the photo sensor 302 are inputted to the compensation controller 211, so that the difference values between the actual intensities of the laser beam and the standard values are calculated by the difference calculator 213 (Step S5). When the interpolator 215 is provided, the interpolation of the difference values corresponding to the stages of the gradation which are not sensed by the photo sensor 302 are executed (Step S6).

Subsequently, the difference values are subtracted from the standard values by the compensator 214 (Step S7). The compensated optical modulation data by the subtraction of the difference values from the standard values in step S7 are memorized in the lookup table 210 instead of the initial data in step S1. As a result, the optical modulation data in the lookup table 210 are renewed (Step S8). When the optical modulation data in the lookup tale are renewed, the compensation of the optical modulation data is completed.

When the laser beams are not emitted from the laser light sources 104R, 104G and 104B at the same time, the above-mentioned steps S1 to S8 are repeated with respect to the laser beams of red, green and blue.

The above-mentioned compensation process of the optical modulation data in the lookup table 210 is executed at least when a power switch of the photographic printer is switched on. It is possible to execute the compensation process when an operator inputs a predetermined command from an input device such as a key board or switches on a dedicated switch, for example, between the jobs for printing the photograph. Furthermore, it is possible to execute the compensation process at a predetermined interval while the power switch of the photographic printer has been switched on.

In the above-mentioned embodiment, since the compensation process is executed while the laser beams are not used for exposing the photographic paper, it is possible to provide a total reflection mirror 301' as shown by dotted line in FIG. 4, which is withdrawal while the photographic paper is exposed, instead of the beam splitter 301.

As mentioned above, the intensities of the laser beams emitted from the laser light sources 104R, 104G and 104B are maintained in a predetermined range less than ±3% by the laser driver 220 in the embodiment, similar to the conventional case. Furthermore, the intensities of the laser beams passing through the modulators 108 are sensed by the photo sensors 302, and the optical modulation data in the lookup table 210 used for controlling the amplitudes of the driving signals of the modulators 108 are compensated by using the actual intensities of the laser beams sensed by the photo sensors 302. Thus, the variation of the intensities of the laser beams emitted from the laser light sources 104R, 104G and 104B can be canceled by the feedback control of the modulators 108, so that the variation of the intensities of the laser beams used for exposing the photographic paper can be restricted in a range less than ±1%. As a result, the quality of the printed photograph can be increased and the tint of the printed photographs using the same image data can be maintained with no relation to the printed time.

In the above-mentioned compensation process of the optical modulation data in the lookup table 210, the standard values are used as the initial optical modulation data. It, however, is possible to use the optical modulation data in the lookup table 210 used for exposing the photographic paper just before the compensation process as the initial modulation data. Furthermore, in the above-mentioned embodiment, the contents of the lookup table 210 will be erased when the power switch of the photographic printer is switched off, so that it is necessary to initialize the optical modulation data in the lookup table 210 by using the standard values. It, however, is possible to memorize the optical modulation data in the lookup table 210 by configuring the lookup table 210 as a nonvolatile storage such as a flash memory, even when the power switch of the photographic printer is switched off. By such a configuration, the initialization of the lookup table can be omitted in the compensation process.

The standard values used in the above-mentioned embodiment are linear as shown in FIG. 5. The standard values, however, are not necessarily linear. The number of stages of the gradation of the image data is not necessarily restricted by the example of the 256 stages. An optional number can be selected as the number of the stages of the gradation. Furthermore, an electro-optic modulator or a magneto-optic modulator can be used as the modulator 108 instead of the acousto-optic modulator.

Furthermore, in the above-mentioned embodiment, the polygon mirror 120 and the fθ lens 121 are disposed on the same plane as the laser light sources 104R, 104G and 104B and the adjustable mirrors 110. It, however, is possible to dispose the polygon mirror 120 and the fθ lens 121 on a plane different from the laser light sources 104R, 104G and 104B and the adjustable mirrors 110 by providing a pair of parallel mirrors, so that the horizontal area occupying the laser beam scanner can be made narrower even though the height of the laser beam scanner increases.

Furthermore, the laser beam scanner 100 is used for exposing the photographic paper in the photographic printer. It, however, is not restricted the use of the laser beam scanner in accordance with the present invention. It is possible to apply the exposing unit of a color laser beam printer, or the like.

This application is based on patent application 2000-088732 filed in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A laser beam scanner comprising:
   at least a set of laser light sources for emitting a laser light beams,
   a laser driver provided with a laser light intensity sensor and adapted for driving at least one laser light source to emit a laser light beam within a first predetermined variation range under a feedback control using said laser light intensity sensor, a modulator for modulating an intensity of the laser light beam passing therethrough, a modulator driver for driving said modulator by using a set of optical modulation data for the laser light beam, and a modulated beam sensor disposed on an optical path of the laser light beam downstream of said modulator for sensing the intensity of the laser light beam that has passed through said modulator and has been modulated by said modulator;

said modulator driver including:

a renewable first memory for memorizing the set of optical modulation data corresponding to respective stages of gradation of image data for the laser light beam;

a second memory for memorizing a set of standard intensity values corresponding to a plurality of predetermined stages of the gradation of the image data for the laser light beam;

a difference calculator for calculating difference values between actual intensities of the laser light beam sensed by said modulated beam sensor and the standard intensity values stored in said second memory; and a compensator for compensating the optical modulation data in accordance with the difference values calculated by said difference calculator to maintain the intensity of the laser light beam having passed through said modulator within a second predetermined variation range less than the first predetermined variation range at each stage of gradation.

2. The laser beam scanner in accordance with claim 1, wherein said first memory is a nonvolatile memory for memorizing the optical modulation data even when an electric power supplied to said driver is switched off.

3. The laser beam scanner in accordance with claim 2, wherein the first memory initially memorizes the standard intensity values as initial optical modulation data and the difference calculator calculates the difference values while the modulator driver drives said modulator using the initial optical modulation data.

4. The laser beam scanner in accordance with claim 1, wherein the difference value is subtracted from the optical modulation data in said first memory corresponding to the gradation of the image data at a time when the intensity of the laser light beam is sensed by said modulated beam sensor, and a subtracted value is renewed as a compensated optical modulation data.

5. The laser beam scanner in accordance with claim 1, wherein the difference calculator calculates the difference value between actual intensity of the laser light beam sensed by modulated beam sensor and the reference intensity values stored in said second memory for selected number of stages of gradations and the compensator includes an interpolator for determining the modulation data for the stages of gradations for which the difference calculation was not made.

6. The laser beam scanner in accordance with claim 1, wherein three sets of the laser light sources, said modulator and said modulator driver are prepared for three principal colors or complementary colors thereof.

7. The laser beam scanner in accordance with claim 1, wherein the modulated beam sensor is arranged to sense intensity of the laser light beam having passed through and modulated by said modulator for selected modulated intensity corresponding to selected stages of gradations.

8. A photographic printer including a laser beam scanner, a conveyor for conveying a photographic paper to a predetermined scanning plane of the laser beam scanner and a developer for developing a latent image exposed on the photographic paper by the laser beam scanner, wherein the laser beam scanner comprising:

at least a set of laser light sources for emitting laser light beams, a laser driver provided with a laser light intensity sensor and adapted for driving at least one laser light source to emit a laser light beam within a first predetermined variation range under a feedback control using said laser light intensity sensor, a modulator for modulating intensity of a the laser light beam passing through said modulator, a modulator driver for driving said modulator by using a set of optical modulation data for the laser light beam, and a modulated beam sensor disposed on an optical path of the laser light beam downstream of said modulator for sensing the intensity of the laser light beam that has passed through said modulator and has been modulated by said modulator;

said modulator driver including:

a renewable first memory for memorizing the set of optical modulation data corresponding to respective stages of gradation of image data for laser light beam;

a second memory for memorizing a set of standard intensity values corresponding to a plurality of predetermined stages of the gradation of the image data for laser light beam;

a difference calculator for calculating difference values between actual intensities of the laser light beam sensed by said modulated beam sensor and the standard intensity values stored in said second memory; and a compensator for compensating the optical modulation data in accordance with the difference values calculated by said difference calculator to maintain the intensity of the laser light beam having passed through said modulator within a second predetermined variation range less than the first predetermined variation range at each stage of gradation.

9. The photographic printer in accordance with claim 8, wherein said first memory is a nonvolatile memory for memorizing the optical modulation data even when an electric power supplied to said driver is switched off.

10. The photographic printer in accordance with claim 9, wherein the first memory initially memorizes the standard intensity values as initial optical modulation data and the difference calculator calculates the difference values while the modulator driver drives said modulator using the initial optical modulation data.

11. The photographic printer in accordance with claim 8, wherein the difference value is subtracted from the optical modulation data in said first memory corresponding to the gradation of the image data at a time when the intensity of the laser light beam is sensed by said modulated beam sensor, and a subtracted value is renewed as a compensated optical modulation data.

12. The photographic printer in accordance with claim 8, wherein the difference calculator calculates the difference value between actual intensity of the laser light beam sensed by modulated beam sensor and the reference intensity values stored in said second memory for selected number of stages of gradations and the compensator includes an interpolator for determining the modulation data for the stages of gradations for which the difference calculation was not made.

13. The photographic printer in accordance with claim 8, wherein three sets of the laser light sources, said modulator, and said modulator driver are prepared for three principal colors or complementary colors thereof.

14. A laser beam scanner comprising:
- a set of laser light sources for emitting laser light beams;
- a plurality of laser light intensity sensors, each of said laser light intensity sensors senses at least one intensity of the laser light beam emitted from at least one of said laser light sources;
- a plurality of laser drivers, each of said laser drivers drives at least one of said laser light sources to emit the laser light beam within a first predetermined variation range under a feedback control using at least one of said laser light intensity sensors;
- a plurality of modulators, each of said modulators modulates at least one of intensity of at least one of the laser light beams;
- a plurality of modulator drivers, each of said modulator drivers drives at least one of said modulators using a set of optical modulation data for each laser light beam;
- a plurality of modulated beam sensors, each of said modulated beam sensors senses at least one of intensity of at least one of the laser light beams modulated by each of said modulators;

each of said modulator drivers includes:
- a renewable first memory for memorizing the set of optical modulation data corresponding to respective stages of gradation of image data for each laser light beam;
- a second memory for memorizing a set of standard intensity values corresponding to a plurality of predetermined stages of the gradation of the image data for each laser light beam;
- a difference calculator for calculating difference values between actual intensities of the laser light beam sensed by modulated beam sensor and the standard intensity values stored in said second memory; and
- a compensator for compensating the optical modulation data in accordance with the difference values calculated by said difference calculator to maintain the intensities of the laser light beams having passed through at least one of said modulators within a second predetermined variation range which is less than the first predetermined variation range at each stage of gradation.

* * * * *